March 15, 1949.     W. LEATHERS ET AL     2,464,592
ELECTRICAL GYROSCOPICALLY ACTUATED CONTROL DEVICE
Filed Dec. 29, 1945     3 Sheets-Sheet 1
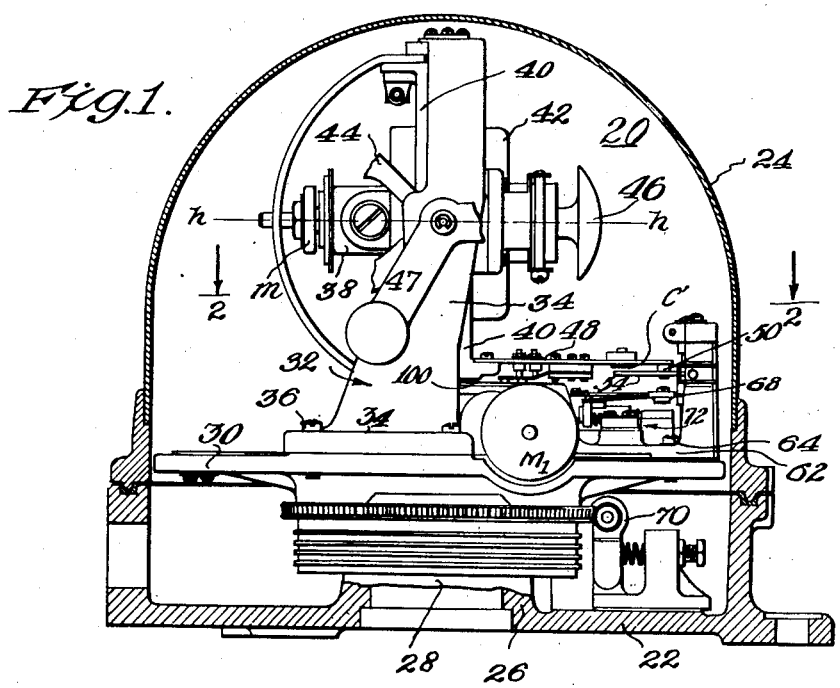
INVENTORS.
WARD LEATHERS,
GEORGE S. DIMONICO
BY
ATTORNEY

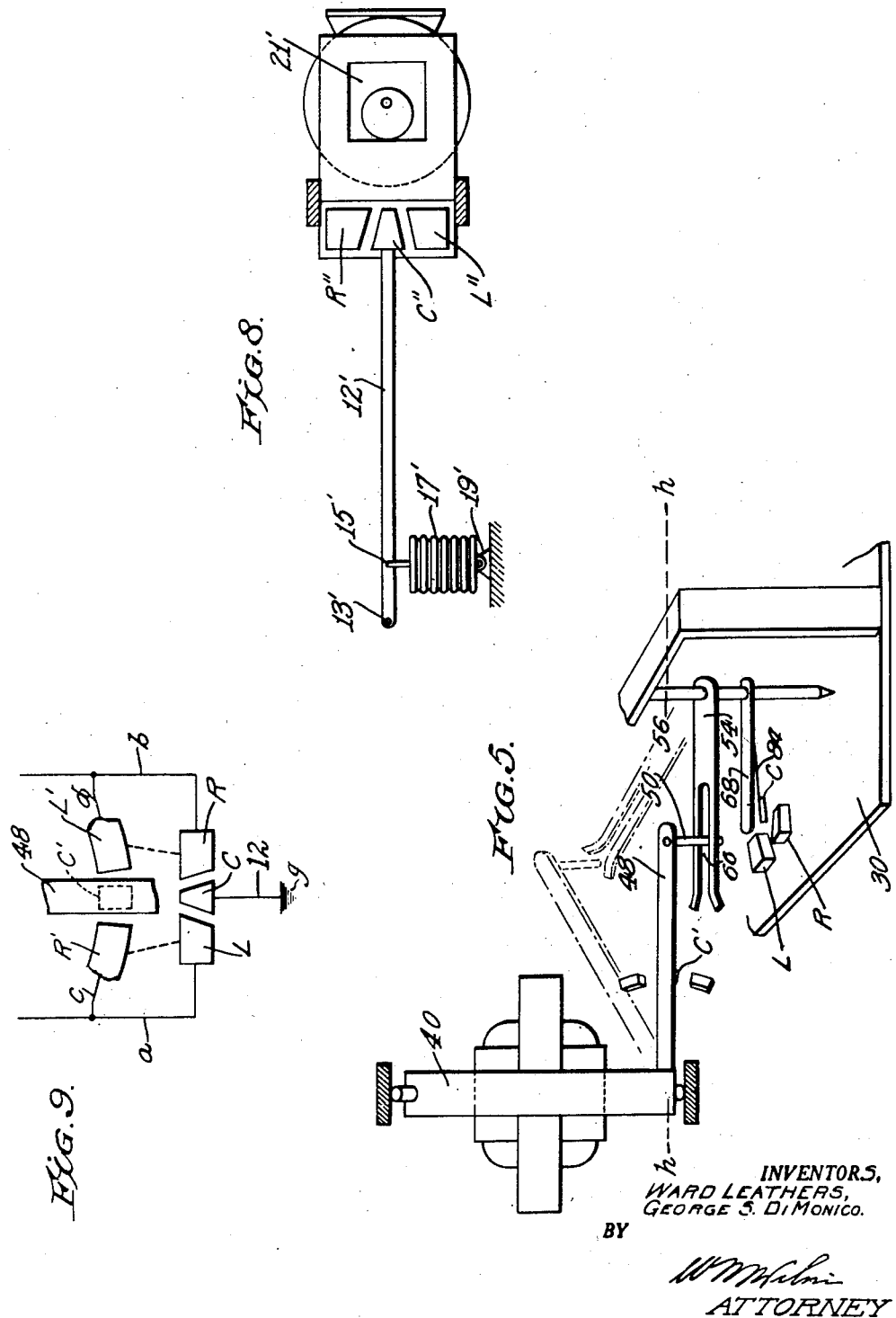

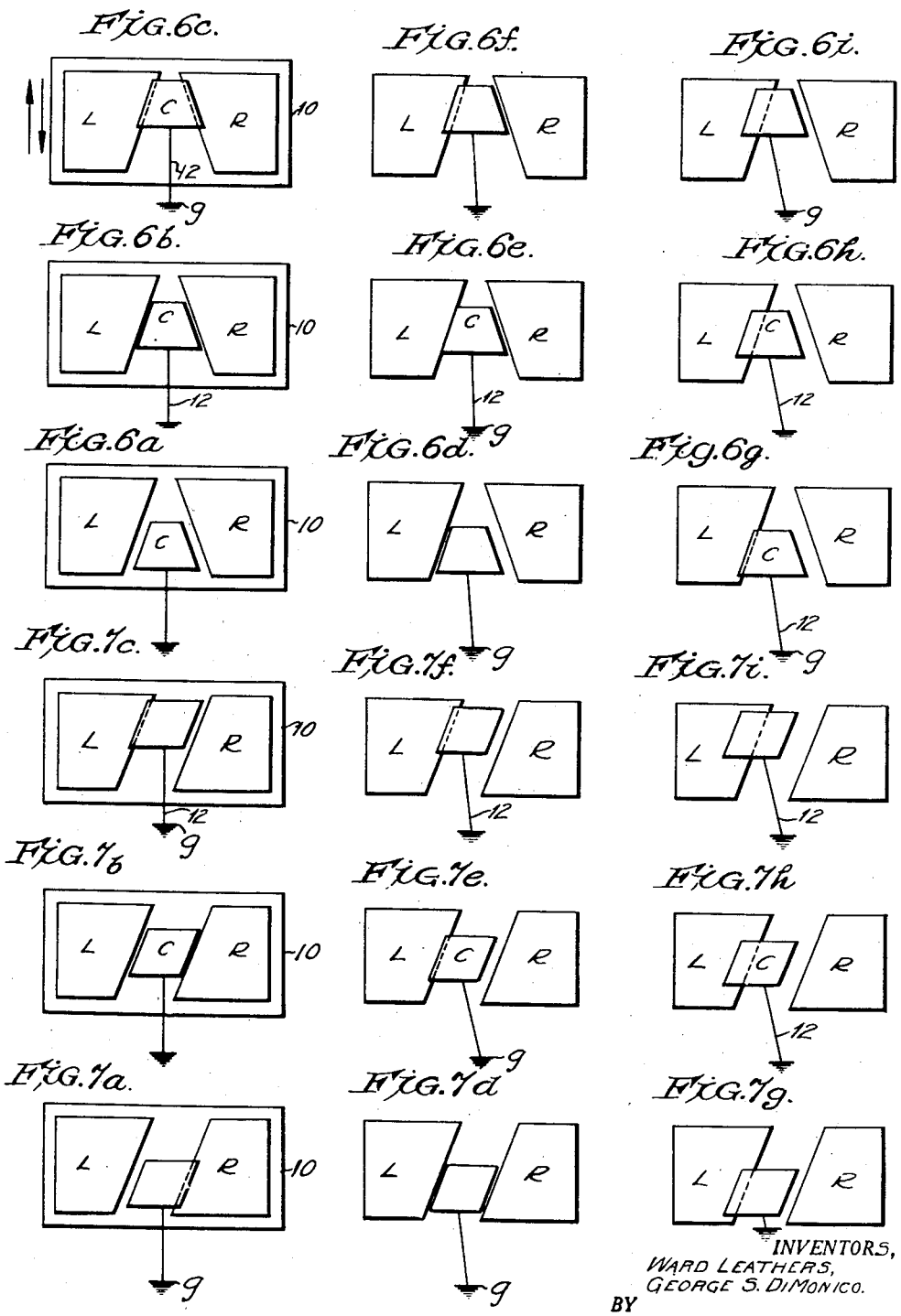

Patented Mar. 15, 1949

2,464,592

UNITED STATES PATENT OFFICE 2,464,592

ELECTRICAL GYROSCOPICALLY ACTUATED CONTROL DEVICE

Ward Leathers and George S. Di Monico, Brooklyn, N. Y., assignors to International Business Machines Corporation, New York, N. Y., a corporation of New York Application December 29, 1945, Serial No. 638,395

8 Claims. (Cl. 74—5.6)

The present invention relates to electrical control mechanism and, more particularly, to an electrical sensing device which, in its broadest aspect, is designed for use in determining or sensing the direction of displacement or deviation of one movable member from a fixed member and to discriminate the extent of such deviation and, finally, to exert an electrical control, the operation of which is dependent upon the direction and extent of such displacement or deviation.

The invention is particularly well adapted for use in connection with a gyroscopic rotor to determine or sense the direction of deviation of an artifically established direction line, as for example, an axial direction which is predetermined by the base or casing of the gyroscope from a fixed or celestial direction in space as established by the gyroscopic rotor. The invention is equally well adapted for use in connection with a pendulous member to determine the direction of deviation of an artificially established direction line from the normal vertical direction of the pendulous member. In its broadest aspect, the invention is capable of use in determining or sensing the relative direction of deviation between any two relatively movable members. In a copending application of Ward Leathers et al., Serial No. 638,394, filed December 29, 1945, for Stabilized gun control mechanism, of which this application is a continuation-in-part, a specific application of the invention for gun stabilizing purposes has been shown.

According to the above mentioned application, the celestial or fixed direction in space is established by means of a gyroscopic rotor and the artificial direction is established by means of a rotatable turn-table associated with the gyroscope and normally fixed relative to the gyroscopic casing. Upon involuntary deviations of the artificial reference line from the fixed reference line, electrical and hydraulic control mechanisms are set into operation which tend to restore the turn-table, and consequently the artificial direction, to coincidence with the axis of the gyroscopic rotor. In this manner, stabilization of a tank turret in azimuth or of a gun mounted thereon in elevation may be effected. For target finding operations, voluntary shifting of the artificial reference line by turning of the turn-table similarly sets into operation the electrical and hydraulic control mechanisms tending to restore the artificial reference line to coincidence with the axis of the rotor.

The present invention is concerned primarily with an electrical pick-off mechanism, by means of which any deviation of an artificial reference line from a fixed reference line will be detected, both as to direction and to magnitude, and suitable electrical circuits are set into operation in order that any desired type of control, whether electrical or hydraulic, or both, may be effected. The invention has been illustrated herein in connection with a gyroscope wherein the fixed or celestial direction is established by means of, and is coincident with, the axis of rotation of the gyroscopic rotor. It will be understood, however, that in the case of a pendulous member the fixed direction will, of course, be established by means of the vertical axis of this member when the latter is at rest.

Briefly, the pick-off member includes a pick-off arm which, in the case of a gyroscope, may be fixedly secured to one of the gyroscopic gimbal rings so as to project outwardly therefrom. In the case of a pendulous member, the pick-off arm will be fixed in any suitable manner to the arm itself and thus, in either instance, the pick-off arm will establish a fixed or a celestial direction in space. In the broadest aspect of the invention, the pick-off arm itself may comprise a contact carrying element and the contact carried thereby is designed for cooperation with a pair of contacts mounted upon the movable member which establishes the auxiliary reference direction or axis. Normally, this movable member is so positioned or oriented that the auxiliary axis coincides with the fixed or celestial direction and when this is the case the single contact carried by the pick-off arm is centered with respect to the two contacts carried by the movable member and cooperates in an identical manner with both of them to produce equal and opposite electrical effects. However, upon deviation of the auxiliary reference line from the fixed reference line in one direction or the other, as occasioned by relative turning movement of the movable member with respect to the fixed reference line, the contact carried by the pick-off arm will cooperate with one of the two contacts on the movable member in an increasing degree or manner, as will be explained subsequently, and with the other contact in a decreasing degree or manner to produce unbalanced electrical effects and advantage is taken of these unbalanced electrical effects to exert the necessary or desired degree of control. The extent of unbalance between the two electrical effects thus afforded by shifting of the movable contacts is in proportion to the extent of deviation or displacement between the movable and fixed reference lines.

Where the pick-off arm itself constitutes a contact carrying member, the contact must be positioned on the arm at a relatively great distance from the turn axis of the gyroscopic rotor for satisfactory sensing and discrimination to take place with extremely slight angular deviation between the reference axes. If the pick-off mechanism is to be a self-contained unit within the gyroscopic casing, space limitations preclude the possibility of extremely long dimensions for the pick-off arm and, as a consequence, according to a modified form of the invention, means are provided for very materially extending the effective length of the pick-off arm which is of necessity relatively short. To accomplish this, a leverage system is employed wherein relative motion between the artificial reference axis and the fixed reference axis is magnified, and toward this end a secondary pick-off arm is employed which is pivoted at a point remote from the axis of the primary pick-off arm and which has a connection with the latter from a region near the pivotal axis of the secondary arm to a region remote from the pivotal axis of the primary pick-off arm so that extremely small displacements will result in greatly magnified swinging movements of the secondary pick-off arm. The secondary pick-off arm carries adjacent its outer end a sensing contact, the sweep of which is relatively great inasmuch as it is determined by the ratio of the length of the primary pick-off arm to the distance from the point of connection between the two pick-off arms to the pivotal center of the secondary pick-off arm. By an arrangement of this type, extremely small displacements between the auxiliary reference line and the fixed reference line result in greatly magnified displacements of the sensing contact in the vicinity of coincidence between the two reference lines. It is ordinarily in this narrow region that sensing operations are most important and this is especially true in the case of gun stabilizing operations.

Inasmuch as the stability of the gyroscopic rotor is greatly affected by the application of any external force, however, slight, tending to change the direction of its axis due to the tendency of the rotor to instantly tip at right angles to the force applied, means are provided, according to the present invention, for overcoming the frictional inertia that would ordinarily be present upon initial deviation between the auxiliary and fixed reference axes and due to the relatively high coefficient of friction between the opposing surfaces of the various sensing contacts. In order to accomplish this aim, means are provided whereby the two sensing contacts carried by the movable member are caused to reciprocate in unison at a predetermined rate and throughout a predetermined extent to establish a relative movement with respect to the single cooperating contact carried by the pick-off arm. The shape of the various contacts is so designed that when the auxiliary and fixed reference axes are in alignment, the contact carried by the pick-off arm remains stationary and moves simultaneously into and out of engagement with both of the reciprocating contacts so as to create equal and opposite electrical effects evidenced by simultaneous intermittent closing of two electrical circuits associated with the contacts. Upon turning movement of the movable member relative to the axis of the rotor in one direction or the other, the reciprocating pair of contacts will be displaced relative to the other contact in such a manner that as the contacts continue to reciprocate one circuit will become effective for a longer period of time than the other circuit and as the displacement increases in this direction the former circuit will become effective for longer and longer periods of time, while the other circuit will become effective for shorter and shorter periods of time until such time as only the former circuits become effective while energization of the latter circuit is discontinued. The reverse is true when displacement takes place in the opposite direction.

Where the sensing contact is carried directly by the pick-off arm, relative displacement of contacts will occur only by virtue of shifting movement laterally of the pair of oscillating contacts. Where the sensing contact is carried upon an auxiliary pick-off arm, as previously described, although the primary pick-off arm will remain fixed in space, relative displacement between the sensing contact and the pair of reciprocating contacts takes place by shifting motion of both the sensing contact and the pair of oscillating contacts in opposite directions.

When relative displacement between the auxiliary line of reference and the fixed line of reference takes place, as described above, the application of longer impulses to one electrical circuit and shorter impulses to the other electrical circuit upsets an electrical balance and advantage is taken of this factor to exert an electrical control by means of work circuits, the nature of which may vary widely and which form no part of the present invention. As indicated in the above mentioned co-pending application, one form of control that may be exerted is both electrical and hydraulic and is employed for gun stabilizing purposes. It is obvious, however, that any desirable type of external control may be resorted to without altering the principles of the present invention.

It is incidental to the present invention that although the use of contacts which reciprocate at a predetermined rate of speed will serve to overcome frictional inertia, and thus very materially relieve the gyroscopic rotor of any load which would tend to cause precession of the same, such oscillation of the contacts serves to generate in the particular electrical circuits involved current impulses of a periodic or intermittent type and advantage may be taken of this type of electrical current flow to operate suitable transformers, relays, choke coils and other alternating current equipment, thus affording a great variety of types of control that may be applied and which would ordinarily not be available if only a direct current flow in the various circuits was involved.

A still further advantage afforded by the use of oscillating contacts in the sensing system is the availability of electrical current impulses for control purposes even when the two reference axes are in coincidence. With ordinary Wheatstone bridge and similar types of electrical sensing control devices, current is available for control purposes only when relatively large displacements have taken place for at zero displacement and at extremely small displacements little or no current for control purposes is available. In the present instance, throughout all ranges of displacement, substantial current impulses are available for control purposes.

The provision of an apparatus of the character briefly outlined above being the principal object of the present invention, an additional object thereof is to provide an electrical pick-off device for pendulously or gyroscopically controlled mechanisms employing cooperating sensing contacts for regulating initial control circuits wherein at relatively small displacements the sensing contacts are effected for control purposes and wherein when displacements larger than a predetermined displacement are encountered additional control circuits become available to the exclusion of the initial control circuits.

A still further object of the invention is to provide an apparatus of this character wherein upon reduction of large displacements and restoration of small displacements, the initial sensing circuits are automatically restored to effectiveness for control purposes.

Yet another object of the invention in an apparatus of this character is to provide a means for materially increasing the effective length of the pick-off arm in order to accommodate small space limitations.

Still another object of the invention is to provide a pick-off device of this character employing cooperating sensing contacts wherein uniform pressure between the contacting surfaces is at all times maintained, regardless of the relative positions of the contacts.

With these and other objects in view, which will become more apparent as the nature of the invention is better understood, the same consists in the novel construction, combination and arrangement of parts shown in the accompanying three sheets of drawings.

In the drawings:

Fig. 1 is a fragmentary, side elevational view, partly in section, of a gyroscope showing the pick-off mechanism comprising the present invention applied thereto.

Fig. 2 is a sectional view taken substantially along the line 2—2 of Fig. 1 in the direction indicated by the arrows.

Fig. 3 is a sectional view taken substantially along the line 3—3 of Fig. 2.

Fig. 4 is a detailed plan view of an oscillating contact assembly employed in connection with the present invention.

Fig. 5 is a perspective view, partially schematic in its representation, illustrating certain principles of leverage employed in connection with the present invention whereby the extent of the pick-off arm may, in practice, be effectively lengthened.

Figs. 6a to 6i inclusive are schematic views illustrating certain electrical principles of operation employed in connection with the invention.

Figs. 7a to 7i inclusive are schematic views similar to Figs. 6a to 6i respectively illustrating a modified form of the invention.

Fig. 8 is a schematic view illustrating the invention applied to a bellows control sensing mechanism.

Fig. 9 is an electrical circuit diagram showing a portion of a control circuit which may be employed in connection with the present invention.

In all of the above described views like characters of reference are employed to designate like parts throughout.

The circuit making and breaking mechanism comprising the present invention is predicated upon principles which are schematically illustrated in Figs. 6a to 6i inclusive. In each of these figures, a pair of longitudinally reciprocating contacts L and R are designed for cooperation with a laterally shiftable or oscillatable contact C. Engagement of the contact C with the contact L establishes one electrical circuit, while engagement of the contact C with the contact R establishes another electrical circuit. The two electrical circuits may be employed in various ways for control purposes. In the above mentioned co-pending application, these circuits are employed for the energization of a pair of coils associated with a so-called teeter valve and the movements of the teeter valve structure in turn exerts a control upon a hydraulic system, the ultimate function of which is to control the turning movements of a gun turret in azimuth or the swinging movements of a gun barrel in elevation. Additionally, these circuits lead to damping apparatus in the form of iron core choke coils, a transformer and other electrical apparatus for exerting a damping effect upon the hydraulic mechanism to prevent the turret or gun from overshooting its mark. The circuits established by the contacts C, L and R, however, are not necessarily limited to controls for gun stabilizing purposes but may be put to a wide variety of uses, as for example, to operate electrical indicating instruments or to actuate recording or accounting apparatus. Irrespective, however, of the nature to which the control circuits may be put, the essential features of the invention are not destroyed.

The pair of contacts L and R are fixed relative to each other and, toward this end, they may be mounted upon a suitable insulating block 10 having a smooth polished surface with which the upper surface of the contacts L and R are flush (see Fig. 4). Means are provided for reciprocating the block 10 to and fro longitudinally, as shown by the arrows in Fig. 6a, so that the contacts L and R may assume either of the extreme positions relative to the contact C shown in Figs. 6a or 6c. In Fig. 6b, the block 10 is shown in its center or medial position. The contact C is adapted to overlie one or the other or both of the contacts L and R and is carried near the outer end of an arm diagrammatically illustrated in these figures at 12. The position of the arm 12 is a fixed or celestial position in space, inasmuch as this arm is attached to one of the gimbals of a gyroscopic rotor in such a manner that the arm will at all times extend in a direction parallel to the axis of the rotor. In all of these figures this axis is shown by the dotted line h—h.

The block 10 is mounted, in a manner that will be made clear presently, on a movable member capable of rotational movements and is spaced from the center of rotation of the member a sufficient distance that slight rotational movements of the member will cause lateral shifting of the contacts R and L relative to the contact C. In Figs. 6a, 6b, and 6c the contact is shown as being centered laterally upon the two contacts L and R. In Figs. 6d, 6e, and 6f the member 10 has, by virtue of a slight rotational movement of the movable member, shifted slightly to the right, and in Figs. 6g, 6h and 6i the member has been shifted still further to the right to an extreme position.

In the above mentioned co-pending application such shifting of the insulating block 10 laterally, and consequent engagement between the various contacts, serves to energize certain control circuits, by means of which the movable member is restored to its normal position wherein the contacts C, L and R again become centered, but as pointed out above this use of the control circuits is a specific one and numerous other uses are contemplated. In the present application, no specific uses have been disclosed for the circuits involved, inasmuch as they are not essential to the present invention.

In Fig. 6b, with the block 10 in its medial position, the contact C does not quite engage either the contact L or the contact R, so that the two control circuits are open. In Fig. 6a the block 10 has been moved to its outermost position and the contacts L and R are still more remote from the contact C. In Fig. 6c the block assumes its innermost position and the contacts L and R slightly overlap the contact C, so that both control circuits are closed. The net result of this circuit action during oscillation of the block 10 is a series of simultaneous impulses in both control circuits of very short duration.

The block 10 may be reciprocated at any desired rate of speed, but for best results it has been found preferable for gun stabilizing purposes to reciprocate the same at the rate of about thirty times per second. If direction current is applied through the contacts C, L and R, the effect when the contact C is centered laterally on the block 10 is to produce a chopped or intermittent current in both circuits having a substantially flat top wave form.

In Figs. 6d, 6e and 6f the position of the block 10 is not illustrated. In Fig. 6e the contacts C and L barely touch each other while the contacts C and R are separated. In this position one of the control circuits is energized, while the other is not. In Fig. 6d the contact C is out of engagement with both contacts L and R and neither circuit is energized. In Fig. 6f the contact C overlaps the contact L but is separated from the contact R and thus one control circuit only is energized. The net result of this effect when the block 10 is shifted slightly in one direction is to produce in one control circuit intermittent impulses which are of the flat top variety but which are somewhat longer than the impulses afforded in connection with Figs. 6a, 6b and 6c.

It will be understood at this point that the area of contact between the contacts C and L, or C and R, has no effect upon either the extent of current flow or the amount of voltage delivered through the circuits. If the contact C engages either of the contacts L or R with an ever so little amount of overlap, full current flow at full current voltage passes through the circuit and should the overlap area be increased, no higher current flow nor no higher current voltage is attained. The prevailing factor is not extent of overlap but rather its duration of overlap with respect to time in seconds.

In Figs. 6g, 6h and 6i the position of the block 10 is not illustrated. In the cycle illustrated in Figs. 6g, 6h and 6i the duration of contact between the contacts C and L is infinite, while the duration of contact between the contacts C and R is non-existent. Thus current flows continuously in one control circuit and not at all in the other.

In the above description, the central position of the contact C, a single intermittent position thereof, and an extreme or ultimate position thereof, have been treated. It will be understood, of course, that an infinite number of intermediate positions may be assumed by the contact C at which time modifications of the above described circuit actions will take place, resulting in a greater or lesser duration of contact for either the contact L or R and in inversely proportional lesser duration of contact for the other contact.

In Figs. 7a to 7i inclusive, a slightly different arrangement of the contacts C, L and R is shown. In this form of the invention, the shape of the contacts L and R is different from the shape of the corresponding contacts in the previous schematic views, as is also the shape of the contact C. In this form of the invention, the contact C is designed upon reciprocation of the block 10 to alternately engage the contacts L and R.

In the cycle represented by Figs. 7a, 7b and 7c, the contact C is adapted to engage the contact L for a predetermined length of time during each cycle and subsequently to engage the contact R for an equal length of time so that the net result of current flow in the two control circuits during any one cycle remains balanced.

In the cycle represented by Figs. 7d, 7e and 7f, wherein the block 10 (not shown) has shifted slightly to the left, the contact C is adapted to engage the contact L for a relatively long period of time and to engage the contact R for a relatively short period of time. The net result of this is to establish an intermittent current flow of large volume in one circuit and an intermittent flow of small volume in the other circuit. In Figs. 7g, 7h and 7i the contact C overlies the contact L at all times, regardless of the position of the block 10 and at no time does it move into engagement with the contact R. In this manner, a continuous direct current flow is attained in one circuit, while the other circuit remains indefinitely open or unenergized.

Numerous variations of the arrangement of contacts shown in any of the above described schematic views are possible. If desired, the contacts L and R may be spread apart a sufficient distance that with the contact C in its center position neither the contacts L nor R is engaged and both control circuits are completely deenergized. Only when the contacts L and R drift laterally in unison in one direction or the other is a current to be expected in either control circuit. A similar arrangement may be resorted to in connection with the case of alternate engagement between contacts. For control purposes, especially in the case of stabilization where damping operations are conducted, it has been found preferable to have some current flow in both circuits when the contact C is centered for without any current available for control purposes at such a time inferior operation of the control apparatus invariably results.

Referring now to Figs. 1 to 4 inclusive, a gyroscope assembly is designated in its entirety at 20 and includes a base 22 and an upper removable, preferably transparent, dome portion 24, the base and dome cooperating to form together an enclosure or casing in which the operative gyroscope instrumentalities are enclosed. The base 22 is provided with an internal upstanding boss portion 26 affording a ball bearing assembly designated in its entirety at 28 and by means of which there is rotatably supported within the casing a relatively flat disc-like turn-table 30. The gyroscope proper is designated in its entirety at 32 and is supported upon the turn-table 30. The gyroscope includes a supporting frame 34 which is bolted as at 36 to the turn-table 30 and forms a pivotal support for a motor frame 38 and vertical gimbal ring 40 associated with a gyroscope rotor 42. The frame 34 also forms a support for a gyroscope caging device, portions of which are fragmentarily shown at 44 and for a gyroscope erecting device fragmentarily shown at 46, 47. This caging device and erecting device form no part of the present invention.

Upon energization of the gyroscope motor M, the axis $h$—$h$ of the rotor 42 will assume a fixed or celestial position in space. By means not treated herein, the caging device 44 may be employed to bring the axis h—h to a predetermined position within the casing of the gyroscope and the erecting device 46 may be employed to maintain the axis h—h horizontal.

Referring now to Figs. 1 and 5, the gimbal ring 40 has bolted or otherwise secured thereto a forwardly and outwardly extending horizontal contact carrying arm 48 which, when the axis h—h of the rotor 42 is in a horizontal position, is parallel to this axis. Since the arm 48 is attached to and movable with the gimbal ring 40, it is by necessity at all times maintained in parallelism with the axis h—h when the latter is horizontal or if the latter deviates from the horizontal the axis of the arm 48 at least coincides with the vertical plane extending through the axis h—h. The outer end of the arm 48 carries thereon a depending pin or finger 50, the function of which will be set forth presently. The arm 48 also carries on its underneath side a contact brush C', the function of which also will be set forth presently.

The arm 48 corresponds in a general way to the arm 12 described in connection with Figs. 6a to 6i inclusive and 7a to 7i inclusive in that it is at all times maintained in parallelism with the axis or reference line h—h established by the rotor 42. If the arm 48 is employed as a contact carrying arm in the manner of the arm 12 in Fig. 6a to 6i inclusive or 7a to 7i inclusive, the length of this arm for sensitive control purposes will be so great as to preclude its enclosure within the casing of the gyroscope. Thus, in order to attain the same effective length of the arm that would otherwise be required, the arm 48 is designed for cooperation with a second arm 54, by means of which slight displacements between the contact C and the contacts L and R of Figs. 6 and 7 may be materially magnified.

The arm 54 is mounted upon a balance shaft 56 (see also Fig. 3) and the latter is suitably supported in antifriction bearings 58 carried in a framework 60 including a base plate 62 bolted or otherwise secured as at 64 to the turn-table 30. The pin 50 which is carried at the outer end of the contact carrying arm 48 projects into a slot 66 (see Fig. 2) formed in the arm 54. The balance shaft 56 has mounted thereon beneath the arm 54 a contact carrying arm 68 which is maintained fixedly in parallelism with the arm 54. When the pin 50 is disposed within the slot 66 of the arm 54, and the three arms 48, 54 and 68 assume parallel positions within the same vertical plane, an artificial reference line or axis is established by the position of the turn-table 30 and this axis coincides or is parallel with the fixed axis h—h of the gyroscopic rotor 42. As shown in Fig. 1, the turn-table 30 is capable of being rotated relative to the base 22 of the gyroscope casing and, toward this end, a suitable worm gear drive mechanism 70 is provided. This latter mechanism is put into effect, however, only when it is the desire of the gunner or other operator in a stabilizing mechanism to resort to target finding or tracking operations. For all practical purposes, however, insofar as this application is concerned, the drive between the turn-table 30 and base 22 may be ignored and the turn-table considered to be fixed relative to the base 22.

From the above description it will be seen that the rotor 42 establishes the celestial or fixed direction h—h in space which never deviates to any appreciable extent. The base 22, however, and consequently the turn-table 30, may be displaced in one direction or the other, thus causing the balance shaft 56 and its associated instrumentalities to be bodily shifted in one direction or the other substantially laterally, although arcuately, relative to the axis of the contact carrying arm 48.

In order that the direction of any such shifting movement of the turn-table 30 may be determined and the extent of the displacement discriminated, the contact C carried by the arm 68 is designed for engagement with the pair of contacts L and R (see Fig. 4) which are associated with a reciprocable contact carrying assembly 72. The assembly 72 is mounted upon, secured to and movable with a longitudinally reciprocable slide member 74 confined within guides 76 formed on the base plate 62. The contacts L and R may be shaped substantially as shown in Figs. 6a to 6i inclusive or 7a to 7i inclusive and their spacing is such that the same conditions which obtain in connection with Figs. 6a to 6i inclusive or 7a to 7i inclusive is attained for control purposes. The assembly 72 is shown in detail in Fig. 4 and includes the insulation piece or block 10 (previously briefly mentioned) which is secured by means of studs 80 to the slide member 74 and on which the metallic contacts L and R are mounted. A third contact element 82 is also mounted upon the insulation piece or block 10 between the two contacts L and R. The upper surfaces of the three contact pieces L, R and 82 occupy a common plane. The contact element 82 is preferably formed of the same metal as that of the contacts L and R in order to bring frictional resistances down to a minimum. This latter contact element, however, is electrically neutral and has no connection whatsoever in the electrical control circuit, its sole function being to support the contact C and present to the same a smooth surface flush with the surfaces of the contacts L and R.

The contact C is carried at the outer end of a spring arm 84 preferably integrally formed with the arm 68 and the extreme outer end of the arm 84 is supported upon a narrow ledge 86 struck downwardly from the outer end of the arm 68. The arm 68 is relatively rigid and thus the arrangement of parts just described is conducive toward the application of a uniform pressure to the surfaces of the contact elements L, R and 82 at all times.

In order to reciprocate the slide member 74, the outer end thereof has pivoted thereto one end of a link 88, the other end of which is pivotally connected to an eccentric pin 90 (see Fig. 2) carried on an eccentric wheel 92 associated with a gear reduction device 94 operatively connected to a constant speed drive motor M1 suitably supported upon the turn-table 30. The motor M1 is designed to rotate at a constant rate of speed which, when the motor is driving through the gear reduction device 94, ultimately results in a thirty cycle per second reciprocation of the contacts L and R, for it has been found that at this rate of reciprocation an extremely efficient wave form is attained in the control circuits and current having a substantially flat top, chopped wave form capable of being fed to a transformer or other inductance device for damping purposes is attained. While the production of intermittent current is incidental to the present invention, reciprocation of the contacts L and R is resorted to primarily to reduce the frictional drag upon the rotor 42 to a minimum. When the three arms 48, 54 and 68 are in exact alignment with the axis h—h of the rotor coincident with the artificial reference axis or line passing centrally between the contacts L and R, the contact C is centered upon the contacts L and R and no relative motion laterally between the contacts C and L or R is encountered. If means were not provided for reciprocating the contacts L and R to and fro in the direction of the arm 68, a relatively high degree of frictional inertia between the contact C and surface of the contact element 82 would necessarily result. Under these conditions, should the turn-table commence to shift in one direction or the other relative to the celestial or fixed direction indicated by the axis h—h, this frictional resistance would be applied through the arms 54 and 48 and through the gimbal ring 40 to the rotor, thus causing the same to precess more or less violently according to the well known laws of gyroscopic precession. With the contacts R and L and the contact element 82 reciprocating relative to the contact C, a large portion of the frictional resistance offered between the various contact elements is dispensed with since static friction is no longer a factor to be reckoned with and, as a consequence, a light and negligible load is placed upon the rotor.

Referring now to Fig. 9 wherein a diagrammatic illustration is made showing a control circuit that may be employed in connection with the present invention, the contact C is grounded as at g and the wires a and b are control circuit wires leading from the contacts L and R respectively. The pick-off arm 48 and the contact carrying arm 68 are diagrammatically illustrated, in the latter instance by a single line. The pick-off arm 48 carries on its underneath side the contact brush C' designed for selective engagement with a pair of arcuate contact bars R' and L'. When the turn-table 30 becomes deflected beyond a predetermined degree, the contact bars R' and L' are electrically connected by wires c and d to the wires a and b.

From the above description it will be seen that the contact bars R' and L' are employed to effectively short the contacts R and L whenever the extent of displacement between the turn-table axis and the axis of the gyroscope rotor exceeds a predetermined degree. As may be determined from an inspection of Figs. 1 and 2, whenever the displacement exceeds this predetermined degree, the pin 50 will ride completely out of the slot 66 with the arm 54 being turned angularly throughout a wide degree, as illustrated by the dotted lines in Fig. 5. When this occurs, with the displacement being in one direction or the other, one or the other of a pair of lugs 96 are adapted to become engaged by respective latching springs 98 suitably supported adjacent the sides of the base plate 62. When the displacement has been alleviated to such an extent that the pin 50 again reenters the slot 66, the arm 68 is adapted to be restored to its normal position and in such an instance the lug 96 is forcibly drawn away from the retaining latch spring 98. During such time as the wide angular displacement obtains, the contacts C and L remain ineffective, while the contacts C' and L' become effective in their stead.

Referring now to Fig. 1, the contact C' is disposed on the arm 48 substantially medially thereof, while the contacts R' and L' are mounted upon an elevated support 100 above the level of the turn-table 30.

In concluding the description of the pick-off mechanism, it should be borne in mind that the contact assembly shown in Fig. 4 may be constructed along the principles set forth in the description of Figs. 6a to 6i inclusive or set forth in the description of Figs. 7a to 7i inclusive. Otherwise, however, the mechanical arrangement of the pick-off construction remains substantially the same and somewhat different circuit effects are attainable in each of the two cases.

Referring now to Fig. 8, the invention is schematically shown as being employed independently of any gyroscopic action whatsoever. In this instance, an elongated pick-off arm 12' is pivoted as at 13' for swinging movement in a plane and carries at its outer end a contact C'' which is designed for cooperation with a pair of reciprocating contacts R'' and L'' in the manner previously described in connection with the contacts C, R and L. The pick-off arm 12' is connected as at 15' to one end of a bellows member 17' which may, if desired, be barometrically influenced and the other end of which is suitably anchored as at 19'. The contacts L'' and R'' are adapted to be oscillated by a mechanism 21' similar in its nature to the mechanism which causes oscillation of the contacts C and L. Suitable control circuits are available at the contacts C'', R'' and L''.

While there have been shown and described and pointed out the fundamental novel features of the invention as applied to a preferred embodiment, it will be understood that various omissions and substitutions and changes in the form and details of the apparatus illustrated and in its operation may be made by those skilled in the art without departing from the spirit of the invention. It is the intention, therefore, to be limited only as indicated by the scope of the following claims.

What is claimed is:

1. An electrical pick-off and control mechanism for determining the direction of deviation of a movable member from a predetermined fixed line of reference with which the movable member is normally in register comprising a contact mounted on the movable member and movable bodily therewith, a reciprocable member and means for continuously reciprocating the same, and a pair of contacts mounted on said reciprocable member and spaced from each other, said contacts being designed for selective engagement with said first mentioned contact upon deviation of the movable member from registry with said fixed line of reference, said reciprocable member and contacts carried thereby presenting a smooth operating surface upon which the contact carried by said movable member is adapted to slide.

2. An electrical pick-off and control mechanism for sensing the direction of deviation of a movable member from a predetermined fixed line of reference with which the movable member is normally in register and for discriminating the extent of such deviation comprising a contact mounted on the movable member, and a reciprocable member, a pair of contacts mounted on said said reciprocable member in spaced relationship and movable therewith, said contacts being designed for selective engagement with the said other contact upon deviation of the movable member from the fixed line of reference in either direction, means for reciprocating said reciprocable member at a constant rate of reciprocation, the contact carried by said movable member being adapted to intermittently engage said spaced contacts on the reciprocable member simultaneously upon reciprocation of said member when said movable member is in register with the fixed line of reference and being adapted upon deviation thereof from said fixed line of reference to establish contact with one of said other contacts intermittently for increasingly longer periods of time depending upon the extent of deviation thereof from said fixed line of reference.

3. An electrical pick-off and control mechanism for sensing the direction of deviation of a movable member from a predetermined fixed line of reference with which the movable member is normally in register and for discriminating the extent of such deviation comprising a contact mounted on the movable member, a reciprocable member, a pair of contacts mounted on said reciprocable member in spaced relationship and movable therewith, said contacts being designed for selective engagement with the said other contact upon deviation of the movable member from the fixed line of reference in either direction, and means for reciprocating said reciprocable member at a constant rate of reciprocation, the contact carried by said movable member being adapted to intermittently engage said spaced contacts on the reciprocable member simultaneously upon reciprocation of said member when said movable member is in register with the fixed line of reference and being adapted upon deviation thereof from said fixed line of reference to establish contact with one of said other contacts intermittently for increasingly longer periods of time depending upon the extent of deviation thereof from said fixed line of reference until such time as a predetermined degree of deviation has been attained by the movable member after which continuous engagement between said contact on the movable member and one of said other contacts is attained.

4. An electrical pick-off and control mechanism for sensing any deviation of a movable member from a predetermined fixed line of reference with which the member is normally in register comprising a pick-off arm, means maintaining said pick-off arm fixed relative to said line of reference, a cooperating arm mounted on said movable member for turning movements about an axis which is fixed relative to the movable member but which is shiftable bodily with the movable member, means operatively connecting said arms whereby deviation of the movable member from said fixed line of reference will cause turning movement of said second mentioned arm relative to the movable member, a contact carried by said latter arm, and a pair of contacts mounted upon and movable with the movable member and designed for selective engagement with said first mentioned contact upon turning movements of said second mentioned arm.

5. An electrical pick-off and control mechanism for sensing any deviation of a movable member from a predetermined fixed line of reference with which the member is normally in register comprising a pick-off arm, means maintaining said pick-off arm fixed relative to said line of reference, a cooperating arm mounted on said movable member for turning movements about an axis which is fixed relative to the movable member but which is shiftable bodily with the movable member, means operatively connecting said arms whereby deviation of the movable member from said fixed line of reference will cause turning movement of said second mentioned arm relative to the movable member, a contact carried by said latter arm, a reciprocable member mounted on said movable member and means for reciprocating the same continuously at a predetermined rate of speed, and a pair of contacts mounted on said reciprocable member in spaced relationship and designed for selective engagement with said first mentioned contact upon deviation of the movable member from said fixed line of reference in either direction.

6. The combination with a gyroscope including a casing, a rotor and a gimbal support for the latter, of an electrical pick-off mechanism comprising a pick-off arm fixedly secured to said gimbal support and projecting forwardly therefrom to establish a fixed or celestial reference line in space, a turn-table mounted on said casing for turning movements relative thereto, an arm pivotally mounted on said turn-table about an axis perpendicular to the turn-table which is bodily shiftable upon rotary movement of the latter, there being a slot formed in said arm, a finger mounted on the pick-off arm and extending into said slot to establish a driving connection between said arms, a contact mounted on said second mentioned arm at a point rearwardly of and remote from said axis, and a pair of contacts mounted on and movable with the turn-table and designed for selective engagement with said first mentioned contact.

7. The combination with a gyroscope including a casing, a rotor and a gimbal support for the latter, of an electrical pick-off mechanism comprising a pick-off arm fixedly secured to said gimbal support and projecting forwardly therefrom to establish a fixed or celestial reference line in space, a turn-table mounted on said casing for turning movements relative thereto, an arm pivotally mounted on said turn-table about an axis perpendicular to the turn-table which is bodily shiftable upon rotary movement of the latter, there being a slot formed in said arm, a finger mounted on the pick-off arm and extending into said slot to establish a driving connection between said arms, a contact mounted on said second mentioned arm at a point remote from said axis, a reciprocable member mounted on said turn-table, a pair of contacts mounted on said reciprocable member in spaced relationship and movable bodily therewith, and means for continuously reciprocating said reciprocable member at a predetermined rate of reciprocation, said contacts being designed for selective and intermittent engagement with said first mentioned contact upon turning movements of the turn-table.

8. The combination with a gyroscope including a casing, a rotor and a gimbal support for the latter, of an electrical pick-off mechanism comprising a pick-off arm fixedly secured to said gimbal support and projecting forwardly therefrom to establish a fixed or celestial reference line in space, a turn-table mounted on said casing for turning movements relative thereto, an arm pivotally mounted on said turn-table about an axis perpendicular to the turn-table which is bodily shiftable upon rotary movement of the latter, said arm projecting rearwardly of said axis in a direction opposed to the direction of said pick-off arm, means coupling said latter arm and pick-off arm whereby clockwise movement of the latter will cause counterclockwise movement of the former and vice versa, a contact mounted on said second mentioned arm at a point rearwardly of and remote from said axis, and a pair of contacts mounted on and movable with the turntable and designed for selective engagement with said first mentioned contact.

WARD LEATHERS.
GEORGE S. DI MONICO.

REFERENCES CITED

The following references are of record in the file of this patent:

UNITED STATES PATENTS

| Number | Name | Date |
|---|---|---|
| 621,364 | Obry | Mar. 21, 1899 |
| 1,170,614 | Darwin et al. | Feb. 8, 1916 |
| 1,621,835 | Davis | Mar. 22, 1927 |
| 2,365,439 | Schulze | Dec. 19, 1944 |

FOREIGN PATENTS

| Number | Country | Date |
|---|---|---|
| 425,034 | Great Britain | Mar. 4, 1935 |